(12) United States Patent
Gao et al.

(10) Patent No.: US 12,122,306 B2
(45) Date of Patent: Oct. 22, 2024

(54) VEHICLE WINDOW STRUCTURE, VEHICLE WINDOW DECORATION PART AND VEHICLE

(71) Applicant: SAINT-GOBAIN GLASS FRANCE, Courbevoie (FR)

(72) Inventors: Xinqiao Gao, Shanghai (CN); Buyin Yu, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 479 days.

(21) Appl. No.: 17/441,999

(22) PCT Filed: Apr. 14, 2020

(86) PCT No.: PCT/CN2020/084576
§ 371 (c)(1),
(2) Date: Sep. 22, 2021

(87) PCT Pub. No.: WO2020/211732
PCT Pub. Date: Oct. 22, 2020

(65) Prior Publication Data
US 2022/0176895 A1    Jun. 9, 2022

(30) Foreign Application Priority Data
Apr. 16, 2019  (CN) .......................... 201920519249.1

(51) Int. Cl.
*B60R 13/04*    (2006.01)
*B60J 1/20*     (2006.01)

(52) U.S. Cl.
CPC .................. *B60R 13/04* (2013.01); *B60J 1/20* (2013.01)

(58) Field of Classification Search
None
See application file for complete search history.

(56) References Cited

U.S. PATENT DOCUMENTS

| 2,671,541 A | 3/1954 | Kramer |
| 4,546,986 A | 10/1985 | Roselli |
| 5,261,721 A | 11/1993 | Conger et al. |

(Continued)

FOREIGN PATENT DOCUMENTS

| CN | 102145980 A | 8/2011 |
| CN | 101652260 B | 5/2012 |

(Continued)

OTHER PUBLICATIONS

Machine translation of DE-19945540-A1 via EPO (translated Feb. 8, 2024) (Year: 1994).*

(Continued)

*Primary Examiner* — Elizabeth Collister
(74) *Attorney, Agent, or Firm* — Pillsbury Winthrop Shaw Pittman LLP

(57) ABSTRACT

A vehicle window structure includes a vehicle window glass, a decoration part and an encapsulation connecting the vehicle window glass with the decoration part. The decoration part includes a body portion for decoration purpose and an embedded portion connected with the body portion and embedded into the encapsulation. The decoration part further includes a reinforcing portion formed by at least a portion of the embedded portion extending inside the encapsulation.

9 Claims, 1 Drawing Sheet

(56) References Cited

U.S. PATENT DOCUMENTS

| | | |
|---|---|---|
| 9,079,480 B1 | 7/2015 | Williams |
| 2010/0237644 A1 | 9/2010 | Senge |
| 2014/0028048 A1 | 1/2014 | Kornexl |
| 2016/0325609 A1 | 11/2016 | Yu et al. |

FOREIGN PATENT DOCUMENTS

| | | |
|---|---|---|
| CN | 102781868 A | 11/2012 |
| CN | 101754843 B | 6/2013 |
| CN | 203601164 U | 5/2014 |
| CN | 104670338 A | 6/2015 |
| CN | 104828868 A | 8/2015 |
| CN | 105984190 A | 10/2016 |
| CN | 207128588 U | 3/2018 |
| CN | 108099554 A | 6/2018 |
| CN | 210122043 U | 3/2020 |
| DE | 28 55 050 A1 | 7/1979 |
| DE | 199 45 540 A1 | 4/2001 |
| EA | 025305 B1 | 12/2016 |
| EP | 0 080 587 A2 | 6/1983 |
| EP | 0 319 262 A2 | 6/1989 |
| EP | 0 412 782 A2 | 2/1991 |
| FR | 2 580 999 A1 | 10/1986 |
| JP | S54-100022 A | 8/1979 |
| JP | S59-173476 A | 10/1984 |
| JP | H01-145223 A | 6/1989 |
| JP | H03-079442 A | 4/1991 |
| JP | H08-112832 A | 5/1996 |
| RU | 2673304 C2 | 11/2018 |
| WO | WO 2015/129758 A1 | 9/2015 |

OTHER PUBLICATIONS

Examination Report as issued in Indian Patent Application No. 202117039922, dated May 3, 2023.
Extended European Search Report as issued in European Patent Application No. 20791520.8, dated Dec. 8, 2022.
Second Office Action as issued in Chinese Patent Application No. 201711477227.5, dated Feb. 8, 2022.
Office Action as issued in Eurasian Patent Application No. 201990444, dated Dec. 17, 2021.
First Examination Report as issued in Indian Patent Application No. 202017018647, dated Jan. 3, 2022.
Office Action and Search Report as issued in Russian Patent Application No. 2021120395, dated Dec. 20, 2021.
Office Action and Search Report as issued in Russian Patent Application No. 2021121577, dated Dec. 20, 2021.
International Search Report as issued in International Patent Application No. PCT/CN2020/084576, dated Jul. 15, 2020.

* cited by examiner

VEHICLE WINDOW STRUCTURE, VEHICLE WINDOW DECORATION PART AND VEHICLE

CROSS-REFERENCE TO RELATED APPLICATIONS

This application is the U.S. National Stage of PCT/CN2020/084576, filed Apr. 14, 2020, which in turn claims priority to Chinese patent application number 201920519249.1 filed Apr. 16, 2019. The content of these applications are incorporated herein by reference in their entireties.

FIELD OF THE INVENTION

The present disclosure relates to a vehicle window structure of a vehicle, a decoration part used therein and a vehicle adopting the vehicle window structure.

BACKGROUND OF THE INVENTION

At present, in the vehicle window structure using stainless steel as decoration trim, inserts need to be added to enhance the strength of the encapsulation. FIG. 1 shows a cross-sectional view of a vehicle window structure, which includes a decoration trim 1, a vehicle window glass 2, and an encapsulation 3 that connects and relatively fixes the decoration trim 1 to the vehicle window glass 2. For larger decoration trims, a plastic insert 4 needs to be provided before injection molding.

However, the addition of the plastic insert will increase the complexity of the process and the required materials, thus increasing the manufacturing cost.

SUMMARY OF THE INVENTION

The purpose of the present disclosure is to provide a vehicle window structure in which strength is increased in a simple manner.

According to one aspect of the present disclosure, a vehicle window structure is provided. The vehicle window structure comprises a vehicle window glass, a decoration part and an encapsulation, wherein the encapsulation connects the vehicle window glass with the decoration part. The decoration part comprises a body portion for decoration purpose and an embedded portion connected with the body portion and embedded into the encapsulation.

The decoration part further comprises a reinforcing portion formed by at least a portion of the embedded portion extending inside the encapsulation.

The reinforcing portion is configured to extend inside the encapsulation to back surface of the vehicle window glass. Further, the reinforcing portion has an overlap portion of at least 5 mm in length with the vehicle window glass.

The distance between the reinforcing portion and the vehicle window glass in the extending direction of the reinforcing portion remains unchanged. Alternatively, the reinforcing portion gradually approaches or moves away from the vehicle window glass in the extending direction of the reinforcing portion.

Moreover, the body portion, the embedded portion and the reinforcing portion are integrally stamped.

In addition, the reinforcing portion is formed at a position where the encapsulation needs to be supported. Alternatively, the reinforcing portion is configured as a comb structure.

According to another aspect of the present disclosure, a vehicle window decoration part is provided. The vehicle window decoration part comprises a body apportion for decoration purpose and an embedded portion connected to the body portion and embedded into the encapsulation of the vehicle window. The vehicle window decoration part further comprises a reinforcing portion formed by extending at least a portion of the embedding portion.

According to another aspect of the present disclosure, a vehicle comprising the above-mentioned vehicle window structure is provided.

The present disclosure processes the technical effects of low manufacturing cost, no need to change the process, simple and reliable structure.

DETAILED DESCRIPTION OF EMBODIMENTS

The following is a detailed description of the technical solution of the present disclosure with reference to the attached drawings. In the following embodiments, a plurality of details of specific embodiments will be described; however, these details do not constitute limitations to the present disclosure, but for illustrative purposes only.

Figure 1:
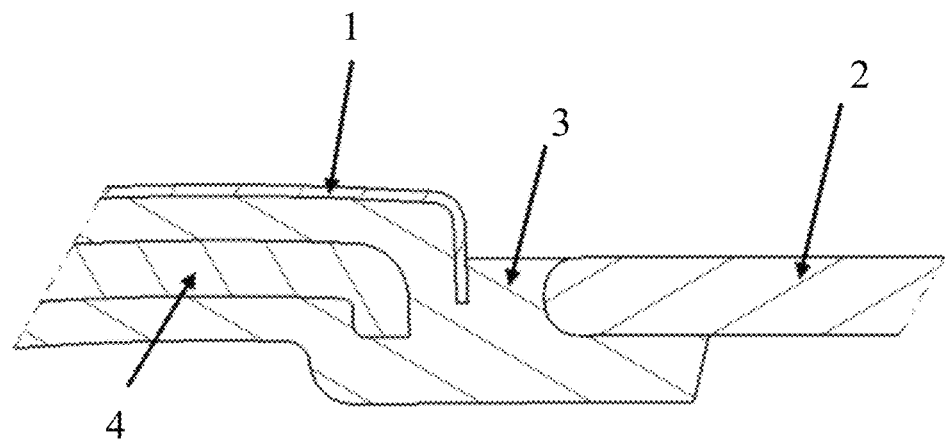
FIG. 1 is a sectional view of a vehicle window structure in the prior art.
Figure 2:
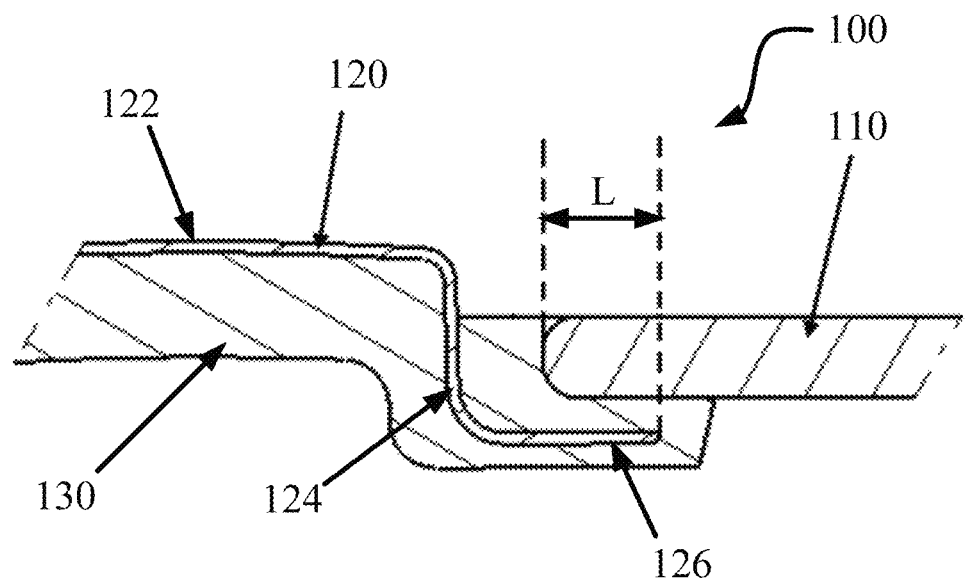
FIG. 2 is a schematic view of a vehicle window structure according to one embodiment of the present disclosure.

As shown in FIG. 2, in one embodiment, the vehicle window structure 100 according to the present disclosure includes a vehicle window glass 110, a decoration part 120 and an encapsulation 130. The encapsulation 130 is configured to encapsulate the edge portion of the vehicle window glass 110, wherein the area of the vehicle window glass 110 encapsulated by the encapsulation 130 can be determined by those skilled in the art according to the specific application, and will not be described in detail in the context of this present disclosure.

The body portion 122 of the decoration part 120 is exposed outside the encapsulation 130, and the embedded portion 124 of the decoration part 120 for fixing is embedded in the encapsulation 130, so that the encapsulation 130 fixes the decoration part 120. In one embodiment, the body portion 122 and the embedded portion 124 are integrally formed, such as by stamping. As shown in FIG. 2, the embedded portion 124 is bent relative to the body portion 122 so as to be at least partially inserted into the inside of the encapsulation 130. The angle of this bending can be determined by those skilled in the art according to the specific application, and will not be described in detail in the context of this present disclosure.

As described above, the encapsulation 130 connects the vehicle window glass 110 and the decoration part 120 to form the vehicle window structure 100.

In the present disclosure, the embedded portion 124 of the decoration part 120 extends to form a reinforcing portion 126. The reinforcing portion 126 is also encapsulated by the encapsulation 130 to support the encapsulation 130. In one embodiment, the reinforcing portion 126 extends to the back surface of the vehicle window glass 110.

The term "back surface" mentioned herein refers to the side facing the vehicle interior when the vehicle window structure is installed on the vehicle, whereas the side facing the vehicle exterior is the front surface. As a result, the aforementioned body portion 122 of the decoration part 120 is configured to be on the front surface of the vehicle window structure.

Similarly, the reinforcement portion 126 is configured to form a bent configuration with respect to the embedded portion 124 so as to extend to the back surface of the vehicle window glass 110 within the encapsulation 130. The bending angle can be determined by those skilled in the art according to the specific application environment.

Further, in one embodiment, the reinforcing portion 126 is configured to be substantially parallel to the vehicle window glass 110. That is, the distance between the reinforcing portion 126 and the vehicle window glass 100 in the extending direction of the reinforcing portion remains unchanged. Of course, those skilled in the art can understand that the "distance remains unchanged" exclude tolerance and process-induced distance changes, or in some cases, can mean that the design distance remains unchanged.

Alternatively, in other embodiments, the reinforcing portion 126 is configured to be inclined with respect to the vehicle window glass 110, that is, the reinforcing portion 126 gradually approaches or moves away from the vehicle window glass 110 in the extending direction of the reinforcing portion. The angle of inclination (i.e. the change in distance from the vehicle window glass) can be determined by those skilled in the art according to the specific application environment.

On the other hand, since the reinforcing portion 126 extends at the back surface of the vehicle window glass 110, the reinforcing portion 126 partially overlaps with the vehicle window glass 110 but does not contact therewith. In one embodiment, the reinforcing portion 126 has an overlap portion of at least 5 mm in length with the vehicle window glass 110, so that the reinforcing portion 126 can provide sufficient support for the encapsulation 130. Herein, the term "length" refers to the distance from the edge of the glass 110 to the projection of the edge of the reinforcing portion 126 on the glass, which is indicated by the symbol L in FIG. 2.

In addition, a portion of the embedded portion 124 extends to form the reinforcing portion 126. For example, in one embodiment, the reinforcing portion 126 may be formed at a position where support for the encapsulation 130 is required, and the reinforcing portion 126 may not be formed at the remaining positions. Alternatively, in another embodiment, the reinforcing portion 126 may be configured as a comb structure.

On the other hand, similarly, in this embodiment, the body portion 122, the embedded portion 124, and the reinforcing portion 12 may be integrally formed, for example, by stamping.

In the above description, the details of the technical solution of the present disclosure are set forth. However, those skilled in the art can understand that the present disclosure is not limited to the specific details listed in the above embodiments, but can be changed within the scope defined by the claims.

The invention claimed is:

1. A vehicle window structure comprising a vehicle window glass, a decoration part and an encapsulation connecting the vehicle window glass with the decoration part, and the decoration part comprising a body portion for decoration purpose and an embedded portion connected with the body portion and embedded into the encapsulation, wherein the decoration part further comprises a reinforcing portion formed by at least a portion of the embedded portion extending inside the encapsulation, wherein the reinforcing portion is configured to extend inside the encapsulation to a back surface of the vehicle window glass, and the reinforcing portion gradually approaches or moves away from the vehicle window glass in an extending direction of the reinforcing portion.

2. The vehicle window structure according to claim 1, wherein the reinforcing portion has an overlap portion of at least 5 mm in length with the vehicle window glass.

3. The vehicle window structure according to claim 1, wherein the body portion, the embedded portion and the reinforcing portion are integrally stamped.

4. The vehicle window structure according to claim 1, wherein the reinforcing portion is formed at a position where the encapsulation needs to be supported.

5. The vehicle window structure according to claim 1, wherein the reinforcing portion is configured as a comb structure.

6. A vehicle window decoration part comprising a body portion for decoration purpose and an embedded portion connected to the body portion and embedded into an encapsulation of the vehicle window, wherein the vehicle window decoration part further comprises a reinforcing portion formed by extending at least a portion of the embedded portion, wherein the reinforcing portion is configured to extend inside the encapsulation to a back surface of the vehicle window glass, and the reinforcing portion gradually approaches or moves away from the vehicle window glass in an extending direction of the reinforcing portion.

7. A vehicle comprising the vehicle window structure according to claim 1.

8. The vehicle window structure according to claim 1, wherein said portion of the embedded portion that forms the reinforcing portion forms a bent configuration with respect a remaining portion of the embedded portion.

9. The vehicle window decoration part according to claim 6, wherein said portion of the embedded portion that forms the reinforcing portion forms a bent configuration with respect a remaining portion of the embedded portion.

* * * * *